(12) United States Patent
Alexander et al.

(10) Patent No.: US 7,549,095 B1
(45) Date of Patent: Jun. 16, 2009

(54) ERROR DETECTION ENHANCEMENT IN A MICROPROCESSOR THROUGH THE USE OF A SECOND DEPENDENCY MATRIX

(75) Inventors: Gregory W. Alexander, Pflugerville, TX (US); Lee E. Eisen, Round Rock, TX (US); Brian W. Thompto, Austin, TX (US); John W. Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/165,355

(22) Filed: Jun. 30, 2008

(51) Int. Cl.
 *H03M 13/00* (2006.01)
(52) U.S. Cl. ...................................................... 714/709
(58) Field of Classification Search ................. 714/709
 See application file for complete search history.

(56) References Cited
U.S. PATENT DOCUMENTS 4,660,202 A 4/1987 Woodsum
5,751,744 A 5/1998 Babb
5,790,715 A 8/1998 Iizuka
5,875,315 A 2/1999 Narayan
6,065,105 A 5/2000 Zaidi et al.
6,216,200 B1 4/2001 Yeager
2005/0184994 A1 8/2005 Suzuoki et al.
2008/0033708 A1 2/2008 Kanapka

*Primary Examiner*—Scott Baderman
*Assistant Examiner*—Sam Rizk
(74) *Attorney, Agent, or Firm*—Casimer K. Salys; McGinn IP Law Group, PLLC

(57) ABSTRACT

A microprocessor error detection method, includes providing a primary dependency matrix, providing an issue logic for issuing a micro-op, providing a secondary dependency matrix comprising a copy of the primary dependency matrix, providing a results available vector, the results available vector including an entry for each dependency tracked, receiving an indication from issue logic that it is issuing a micro-op, reading the secondary dependency matrix row corresponding to the issued micro-op, checking if the micro-op being read is dependent on a tracked dependency that is not satisfied by determining if any bit set in the row read from the secondary dependency matrix is not set in the secondary results available vector, and receiving an indication from the issue logic if the micro-op has been rescinded.

1 Claim, 4 Drawing Sheets

Fig. 4
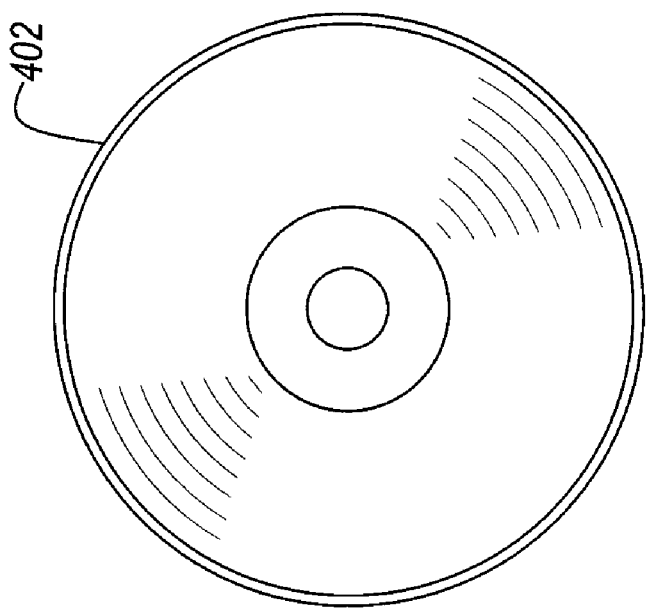
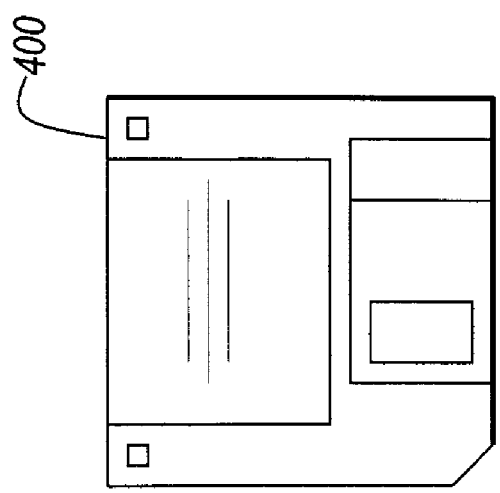

ERROR DETECTION ENHANCEMENT IN A MICROPROCESSOR THROUGH THE USE OF A SECOND DEPENDENCY MATRIX

BACKGROUND OF THE INVENTION

1. Field of the Invention

The present invention generally relates to a method and apparatus for enhancing error detection in a microprocessor, and more particularly to a method and apparatus for enhancing error detection in a microprocessor by using a second dependency matrix.

2. Description of the Related Art

Microprocessors using a dependency matrix to do dependency tracking present a special problem for Reliability, Availability, and Serviceability (RAS) checking. Because the microprocessor arrays are not read or written normally, there is no easy way to check for errors. Furthermore, additional structures such as the picker (age array) may also be difficult to check for soft errors. This presents a special problem if the dependency matrix is to be the only location where dependencies are tracked.

Conventional methods for error checking consist of two methods. The first method is duplicating a primary dependency matrix and a issue logic, which is a logic that is being checked that may actually cause an issue. This requires a great deal of physical area because the issue logic (including picker) can be quite large. Also, the issue logic can be very complicated, and duplicating it in its entirety means also duplicating any bugs present.

The second method consists of creating specialized issue checking logic for each type of dependency tracked by the dependency matrix. This is also undesirable because a dependency matrix may track a large number of different types of dependencies, each requiring an independently designed issue checker. This increases design risk and requires increased design effort.

Thus, a method is desired to check a primary dependency matrix and associated issue logic that does not involve duplicating the issue logic and that also does not require a different check be designed for each type of dependency tracked by the primary dependency matrix.

SUMMARY OF THE INVENTION

In view of the foregoing and other exemplary problems, drawbacks, and disadvantages of the conventional methods and structures, an exemplary feature of the present invention is to provide a method and a to check both the dependency matrix and age array for correctness by creating a second copy of the dependency matrix that is read at instruction issue.

In a first aspect of the present invention, a microprocessor error detection method includes providing a primary dependency matrix, providing a secondary dependency matrix including a copy of the primary dependency matrix, providing issue logic for controlling issue, providing a results available vector, the results available vector including an entry for each dependency to track, receiving an indication from the issue logic that is issuing a micro-op (e.g., a microinstruction, such as an instruction to move the contents of a register to the Arithmetic Logic Unit (ALU) from an issue queue entry under control of the issue logic, reading the micro-op dependency data from the secondary dependency matrix, checking if the micro-op being read is dependent on a tracked dependency that is not satisfied by determining if any bit set in the row read from the secondary dependency matrix is not set in the secondary results available vector, receiving an indication from the issue logic if the micro-op has been rescinded, and signaling an error if any bit set in the row read from the dependency matrix is not set in the secondary results available vector, and the issue logic indicates that the issued micro-op was not rescinded.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 4 illustrates a signal bearing medium 400 (e.g., storage medium) for storing steps of a program of a method according to the present invention.

DETAILED DESCRIPTION OF EXEMPLARY EMBODIMENTS OF THE INVENTION

Figure 1:
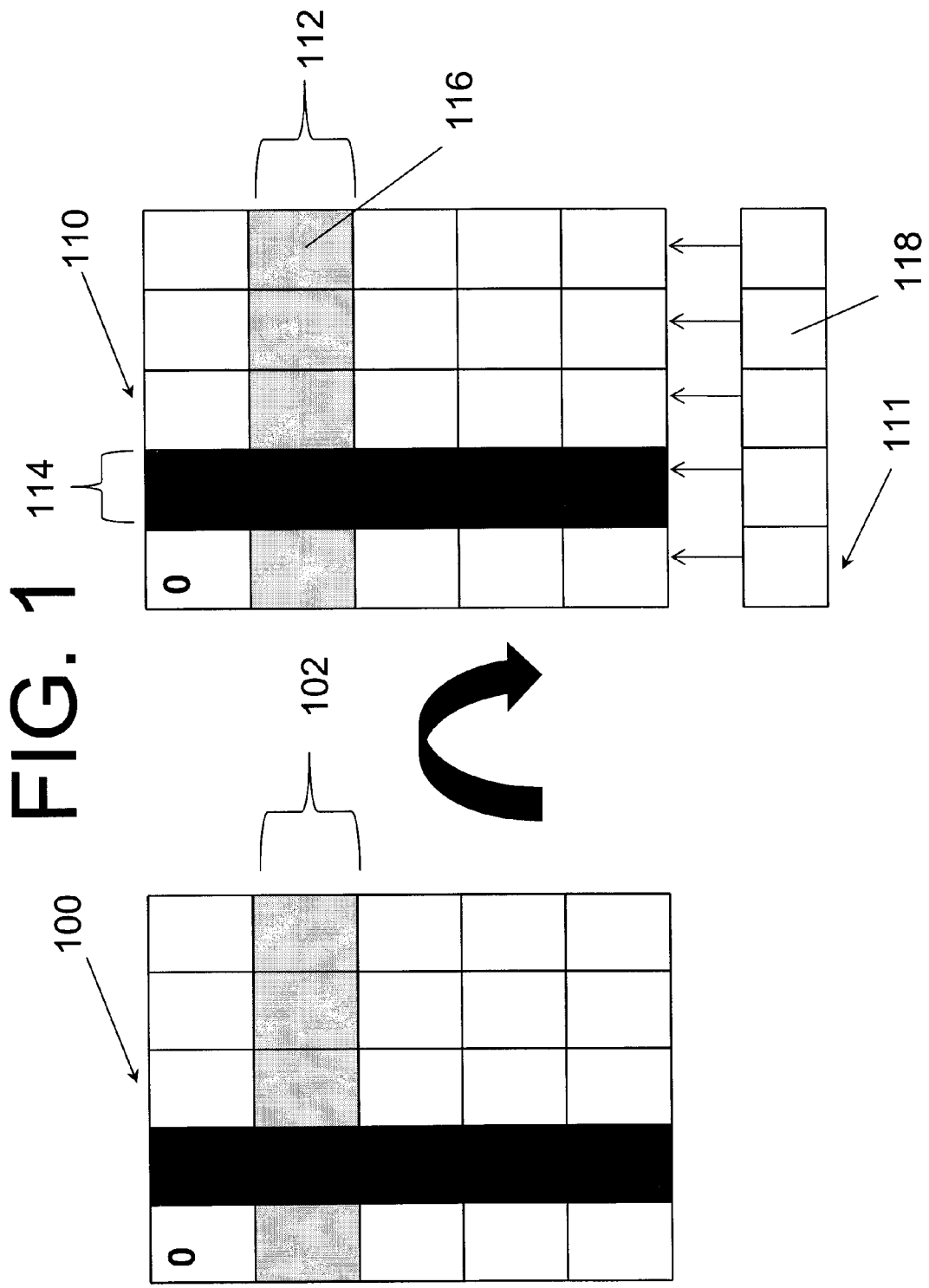
FIG. 1 illustrates a set of dependency matrices in a microprocessor.
Figure 2:
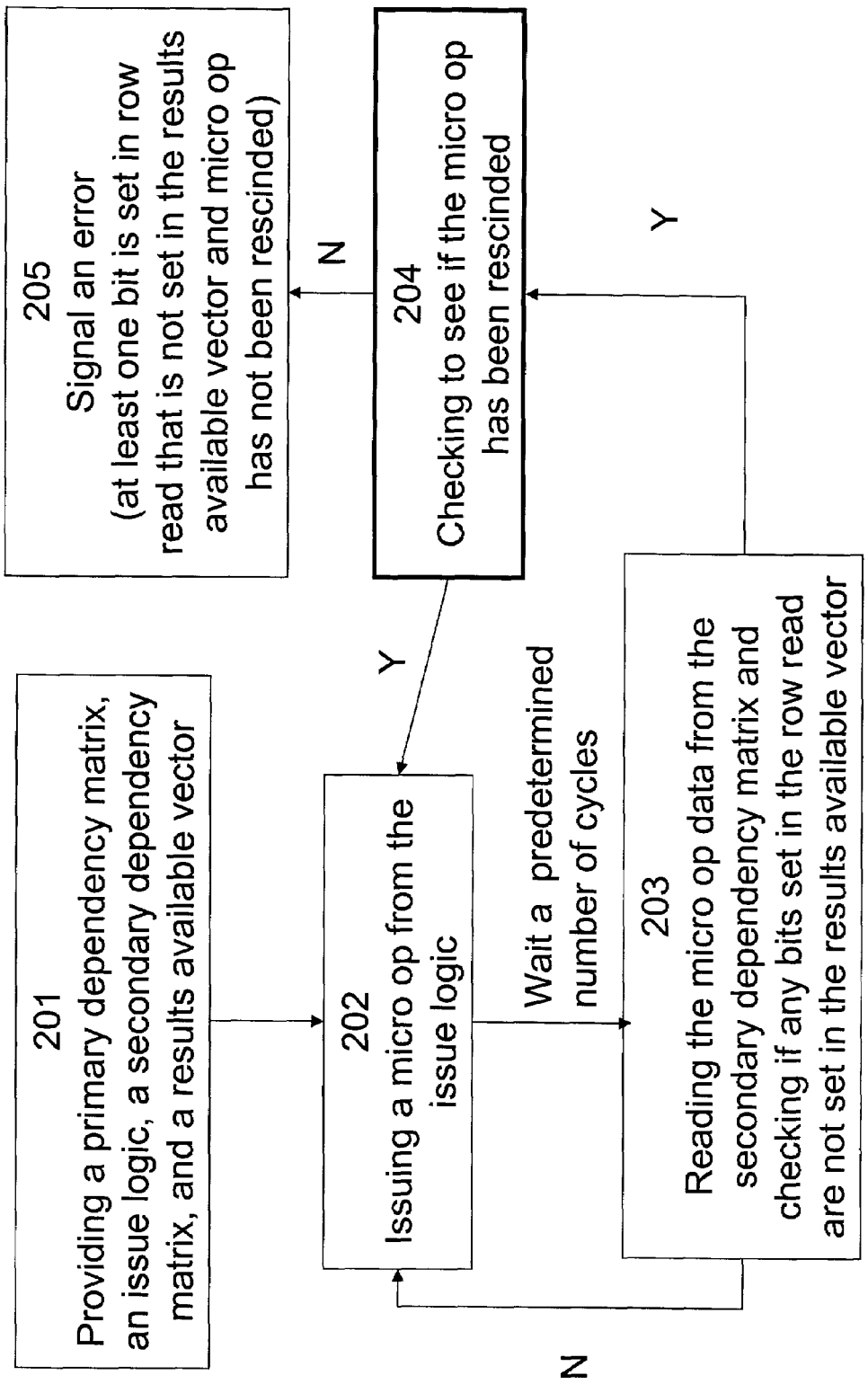
FIG. 2 illustrates an error detection method.

Referring now to the drawings, and more particularly to FIGS. 1 and 2, there are shown exemplary embodiments of the method and structures according to the present invention.

FIG. 1 illustrates a set of dependency matrices in a microprocessor. The dependency matrices include a primary dependency matrix 100 that stores data. In order to check the primary dependency matrix 100, a secondary dependency matrix 110 is maintained, which is substantially a copy of the primary dependency matrix 100. The secondary dependency matrix 110 is made up of a series of write ports, or rows 112, and a series of column clears, or columns 114 arranged similarly as those on the primary dependency matrix 100, and is written with the same data, delayed by a number of cycles. Each of the rows 112 corresponds to an issue queue entry and each column 114 corresponds to a dependency tracked by the secondary dependency matrix 110. Each entry 116 in the matrix stores a bit indicating that the issue queue entry tracked by that row 112 is dependent on the dependency tracked by that column 114.

A results available vector 111 is maintained for the secondary dependency matrix 110. The results available vector 111 also has entries 118 each including a bit, to track when a tracked dependency's results are available and dependent micro-ops (μops) can be issued. Each entry 118 is provided for every tracked dependency. Valid bits in this results available vector 111 are cleared when an entry is written into the secondary dependency matrix 110, and the entry is set in the results available vector 111 when the entry has posted that dependent instructions are allowed to execute.

The secondary dependency matrix 110 also has a read port for as many μops as can be issued in a single cycle.

A fixed number of cycles after a μop issues, the data for that issue queue entry corresponding to a row 112 is read from the secondary dependency matrix 110. Bits equal to 1 in an entry 116 indicate that the μop being read is dependent on the corresponding dependency tracked by the secondary dependency matrix 110. If any bit is set in the secondary dependency matrix 110 and the corresponding bit is not set in the results available vector 111, then an error is signaled if the issue logic does not indicate that the μop is rescinded.

After the appropriate number of cycles have passed since the issue check, the appropriate bit in the results available vector 111 is set. For a μop in the secondary dependency matrix 110 whose results are available for an instruction that is to be issued in the next cycle, any corresponding dependency bits in the results available vector 111 will be set the cycle following the check. For μops taking multiple cycles, the corresponding bits in the results available vector 111 will be set an appropriate number of cycles later. Ideally, such results available bit setting will be done after a μop is past the point of reject, so that the results available bit will not have to be restored on a reject. The details of such restoration are beyond the scope of this invention.

The check performed amounts to checking that any instruction issued must have its dependencies met, but allows the dependency matrix itself to be the only place this is tracked, while still detecting soft errors. This check ensures that both the dependency matrix and the age array (insofar as it contributes to ensuring dependencies are satisfied) have not caused any architectural incorrectness.

FIG. 2 illustrates an error detection method of the present invention. In step 201, a primary dependency matrix 100, a secondary dependency matrix 110 that is a copy of the primary dependency matrix 100, an issue logic for issuing a μop, and a secondary results available vector 111 are provided and made available in a microprocessor. Again, the issue logic and primary dependency matrix constitute the logic that is being checked for error. The results available vector has a dependency tracking entry 118 that includes a bit to track each dependency tracked by the secondary dependency matrix 110.

In step 202, a μop is issued by the issue logic. After waiting for a predetermined number of cycles, the secondary dependency matrix row 112 corresponding to the issued μop is read. Here, it is noted that when secondary dependency matrix row 112 is read, all of the entries 116 in that row 112 are read. The read entries 116 may be referred to as a μop data, a row data, or a dependency data. Therefore, when a row 112 of the secondary dependency matrix 110 is read, a set of secondary dependency matrix entries 116, one per dependency tracked by the secondary dependency matrix 110, is read.

Next, at step 203, checking is performed to determine if the μop being read is dependent on a corresponding dependency tracked by the secondary dependency matrix 110, as identified by having a corresponding bit set in row 112 of the secondary dependency matrix 110 read, and if the dependency has been satisfied, as signified by the corresponding bit being set in the results available vector 111. If all bits set in the row 112 for which the μop being read are set as the corresponding bit in the results available vector 111, step 202 is repeated, and another μop is issued from another row 112 of the secondary dependency matrix 110. Otherwise, if any bits set in the μop data row being read whose corresponding bits is not set in the results available vector 111, the method proceeds to step 204, where it is checked if the μop has been rescinded.

If the μop read has not been rescinded, then the method proceeds to step 205, where an error is signaled.

Figure 3:
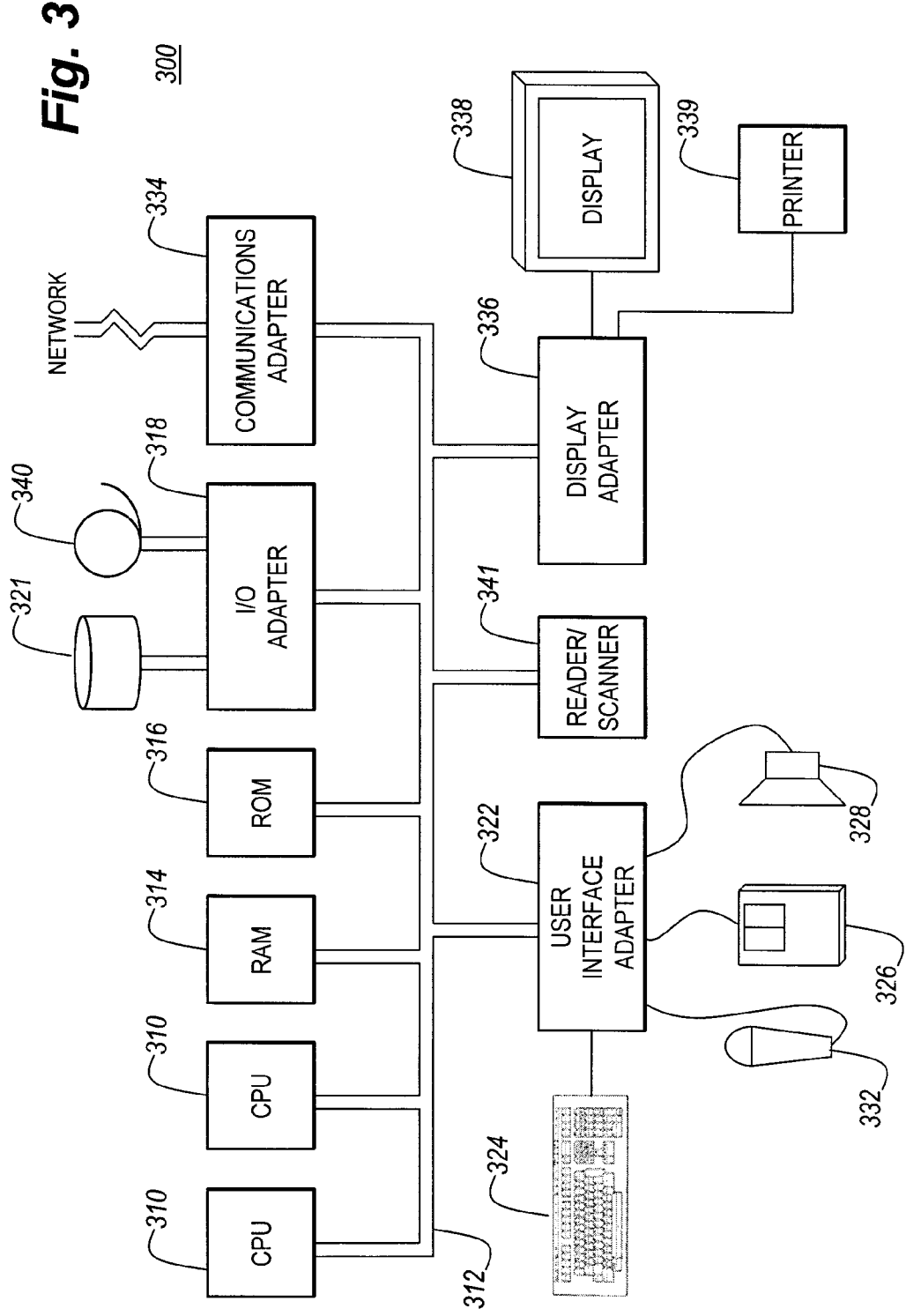
FIG. 3 illustrates an exemplary hardware/information handling system 300 for incorporating the present invention therein.

FIG. 3 illustrates a typical hardware configuration of an information handling/computer system for use with the invention and which preferably has at least one processor or central processing unit (CPU) 310.

The CPUs 310 are interconnected via a system bus 312 to a random access memory (RAM) 314, read only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting an information handling system to a data processing network, the Internet, an Intranet, a personal area network (PAN), etc., reader/scanner 341, and a display adapter 336 for connecting the bus 312 to a display device 338 and/or printer 339.

In addition to the hardware/software environment described above, a different aspect of the invention includes a computer implemented method for performing the above-described method. As an example, this method may be implemented in the particular environment discussed above.

Such a method may be implemented, for example, by operating a computer, as embodied by a digital data processing apparatus, to execute a sequence of machine readable instructions. These instructions may reside in various types of signal bearing media.

This signal bearing media may include, for example, a RAM contained within the CPU 310, as represented by the fast access storage for example. Alternatively, the instructions may be contained in another signal bearing media, such as a magnetic data storage diskette 400 (FIG. 4), directly or indirectly accessible by the CPU 310.

Whether contained in the diskette 400, the computer/CPU 310, or elsewhere, the instructions may be stored on a variety of machine readable data storage media, such as DASD storage (e.g., a conventional "hard drive" or a RAID array), magnetic tape, electronic read only memory (e.g., ROM, EPROM, or EEPROM), an optical storage device (e.g. CD ROM, WORM, DVD, digital optical tape, etc.), paper "punch" cards. In an illustrative embodiment of the invention, the machine readable instructions may comprise software object code, compiled from a language such as "C", etc.

FIG. 4 illustrates a signal bearing medium 400 (e.g., storage medium) and CD ROM 402 for storing steps of a program of a method according present invention.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A microprocessor error detection method, comprising:
providing a primary dependency matrix;
providing an issue logic for issuing a micro-op;
providing a secondary dependency matrix comprising a copy of the primary dependency matrix;
providing a results available vector, the results available vector comprising an entry for each dependency tracked;
receiving an indication from issue logic that it is issuing a micro-op;
reading the secondary dependency matrix row corresponding to the issued micro-op;
checking if the micro-op being read is dependent on a corresponding dependency tracked by the secondary dependency matrix by determining if any bit set in the row read from the secondary dependency matrix is not set in the results available vector;
receiving an indication from the issue logic if the micro-op has been rescinded; and
signaling an error if any bit set in the row read from the dependency matrix is not set in the secondary results available vector, and the issue logic indicates that the issued micro-op was not rescinded.

* * * * *